United States Patent [19]

MacArthur et al.

[11] 4,052,077

[45] Oct. 4, 1977

[54] SHAFT SEAL WITH CLINCH-BUTT METAL CASE AND METHOD OF MAKING SAME

[75] Inventors: Samuel E. MacArthur, Lathrup Village; Stanley N. Smith, Farmington, both of Mich.

[73] Assignee: Federal-Mogul Corporation, Detroit, Mich.

[21] Appl. No.: 673,577

[22] Filed: Apr. 5, 1976

[51] Int. Cl.² ............................................. F16J 15/32
[52] U.S. Cl. ................................................... 277/183
[58] Field of Search .................. 277/65, 182, 183, 1; 138/109

[56] References Cited

U.S. PATENT DOCUMENTS

| 2,486,928 | 11/1949 | Cole | 277/182 |
|---|---|---|---|
| 2,547,257 | 4/1951 | Cole | 277/182 |
| 2,806,725 | 7/1957 | Kosatka | 277/182 |

FOREIGN PATENT DOCUMENTS

| 1,239,174 | 7/1960 | France | 138/109 |

Primary Examiner—Robert I. Smith
Attorney, Agent, or Firm—Robert F. Hess

[57] ABSTRACT

An elastomeric radial lip shaft seal and method of making same wherein the seal is provided with a rigid reinforcing member of generally cylindrical shape and formed from strip stock with the ends thereof joined by clinch-butt construction.

3 Claims, 17 Drawing Figures

SHAFT SEAL WITH CLINCH-BUTT METAL CASE AND METHOD OF MAKING SAME

BACKGROUND OF THE INVENTION

This invention relates to a conventional radial type shaft seal with an elastomeric body which is supported by a rigid metallic case.

The metal case is a necessary part of the seal in that it stabilizes the diameter of the seal through repeated changes in operational temperature. Without the metal case, the elastomer, having a different coefficient of thermal expansion from the bore in which it fits, becomes loose and the assembly fails with repeated temperature cycling.

Heretofore the metal case has been one of the most expensive parts of a conventional shaft seal because of the large amount of waste material involved in the manufacture of this component. Present state of the art has been to form this part from a flat ring or washer which when upset by cold forming becomes generally cylindrical. Traditionally, however, the basic flat ring is cut from rectangular or strip sheet-stock so that geometrically speaking the outsides between the rings becomes scrap as well as the insides which must be removed by a piercing operation.

The present invention relates to the fabrication of the generally cylindrical metal cases from small rectangular blanks of sheet stock that in turn can be cut from large rectangular or strip stock with very little waste. The small rectangular blanks, then, are formed so that the narrow ends can be fastened together to produce the desired generally cylindrical seal cases. When this is done, the flat ring phase the produces the scrap in the present state of the art is deleted from the manufacturing process and scrap production is reduced from approximately 30% to less than 5% of the original sheet stock. Such a saving would allow four seals to be made from a piece of metal that formerly produced only three seals.

SUMMARY OF THE INVENTION

The present invention incorporates a formed split or drawn type metallic case to maintain diametrical stability of a radial shaft seal. The case preferably includes a radial flange having an annularly inward extending terminal portion or flange to which is bonded the elastomeric seal body. The butt joint can be made by any fastening method that maintains stability of the case such as spring tension, clinch-butt, welding, or adhesive. Our primary intent, however, is to use generally rectangular shaped pieces of sheet metal with which to form the seal case. This basic rectangular shape is required because it is the only geometric shape from which a generally cylindrical ring can be formed that can be cut from strip stock with no waste between the primary cuts.

Secondary cuts may be made to facilitate subsequent forming operations but it has been determined that these cuts produce substantially less waste material than do the same size rings cut directly from rectangular sheet stock.

Other objects and advantages of the invention will appear from the following description of a preferred embodiment.

DESCRIPTION OF A PREFERRED EMBODIMENT

Figure 1:
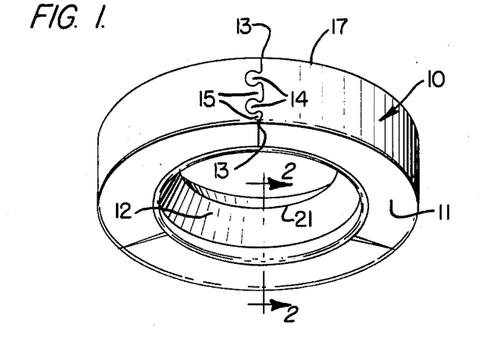
FIG. 1 is an isometric drawing of a complete seal embodying the principles of the invention with an internal flange on a clinch-butt type case.
Figures 2, 3A, 3B:
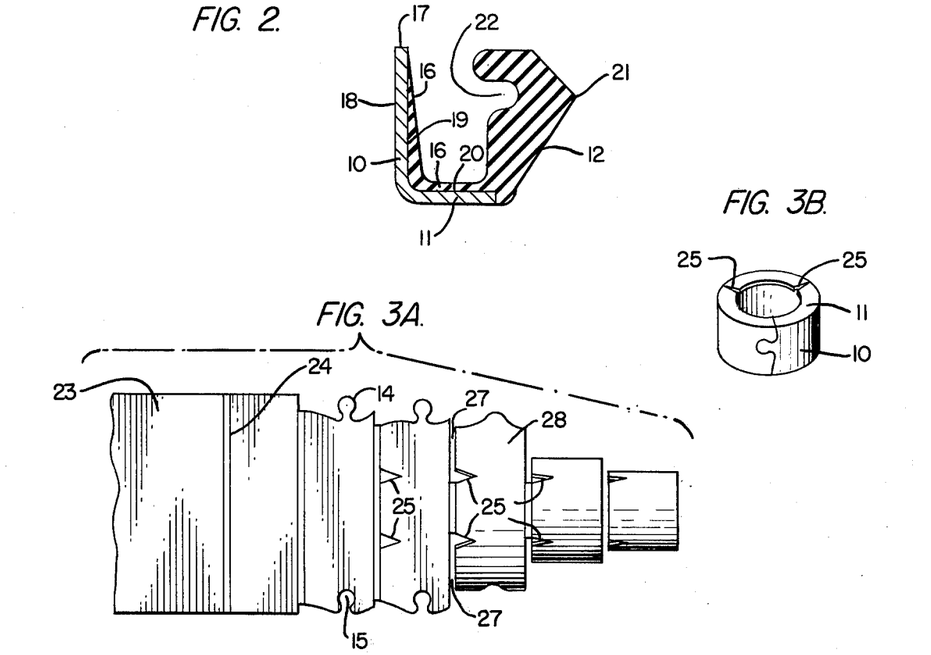
FIG. 2 is a cross-section along line 2—2 of FIG. 1.
FIG. 3A is a progressive representation of the case formation showing areas of waste production.
FIG. 3B is an isometric drawing of a finished case produced from the invention.

FIGS. 1 and 2 show a finished radial lip type shaft seal wherein the outer case or metal reinforcing member 10, is generally made from sheet steel. The case 10 is provided with a cylindrical portion having a bore engaging surface 18 and a radially extending flange 11. Case 10 is joined at it's circumference by means of a clinch-butt joint 13. The butt joint 13 is held together by male protrusions or clinches 14 on one side that fit into female locking devices or clinches 15 on the other side. An elastomeric body 16 is molded and bonded, in a manner described hereinbelow, to axially inner surfaces 19 and 20 of portions 10 and 11, respectively.

The elastomer of the sealing element 12 includes a bonded body portion which extends to cover the entire inside of the case 10 as seen in FIG. 2 and extends further to cover both edges 17 of the case 10 to prevent possible leakage through the butt joint 13. Covering any three surfaces (inside, outside, two edges) will prevent leakage through the joint. The elastomeric body has a main body portion bonded to the axially inner surfaces 19 and 20, and beyond it is a main lip portion 12 having a seal lip 21 and a spring receiving groove 22 to receive, after molding, a garter spring.

With the exception of the clinch-butt joint 13 and that portion of the elastomeric body 16 which includes bonded body portions along inner surfaces 19 and 20, the seal structure depicted in FIGS. 1 and 2 is conventional. These differences in structure are largely due to our novel method of manufacturing radial type shaft seals. As seen in FIG. 3A, our preferred method of manufacture is to first form the cylindrical metal case by feeding, from left to right, a strip of sheet stock 23 into a progressive, cross-blank type die or stamping press.

FIG. 3A shows a typical sequence of operations performed by a progressive die in the present invention for the production of a finished case 10 in FIG. 3B from a strip of sheet stock 23. An initial scoring operation 24 at the first station of a progressive die uses a blade above and a blade below the strip stock which when the die is closed do not actually meet but come so close to each other that the strip stock is partially cut or scored to the extent that the stock is strong enough to move to successive positions but weak enough to tear precisely when subjected to a slight shearing stress. Starting with the score 24 as the first station, the second or trim station of the progressive die shown at the left of FIG. 3A, trims to length or cuts the male clinches 14 and the female clinches 15 with their half triangle notches to develop the required length by shearing action. The small bits of metal that are sheared off at the clinches and half triangle notches if used are waste and are characteristic of the operation when cross-blanking is used as shown. If, however, the progressive die is set up for in-line operation, the male cuts of each piece becomes the female cut for the successive piece and even more waste is eliminated.

The third or piercing operation of the progressive die produces more waste only when triangular notches 25 are cut to allow the formation of an internal flange 11. These notches are a device used to decrease the amount of material available and required to produce an internal radial flange with its characteristically decreasing rate of volume change as it approaches the center. Without the notches 25, the internal flange 11 would become wrinkled in its formation when too much material would be forced into a cavity of two little volume.

In the fourth position or first forming operation 28, score 24 is partially separated at 27 and the major axis of the generally rectangular blank is bent to form a curve. At the fifth station the curve is bent further to form a U. At the sixth station the male and female clinch parts are coined and locked together, the ring is formed and severed entirely from the strip stock 23. In FIG. 3B the notched end is upset to form the internal flange 11 on the completed case 10.

Figure 3C:
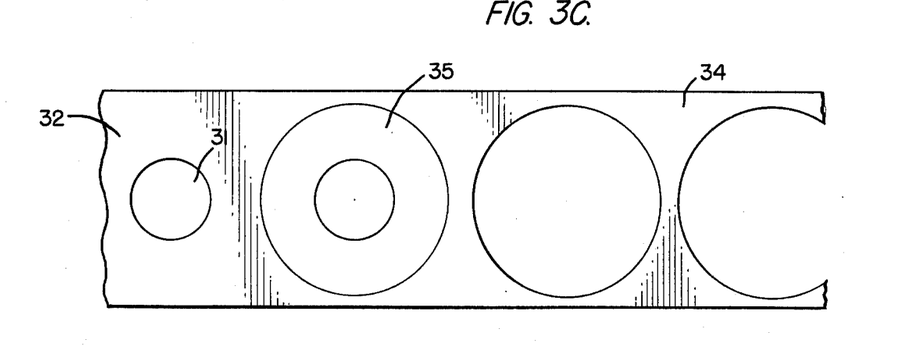
FIG. 3C is a similar representation of conventional case formation showing areas of waste production.

FIG. 3C shows the prior art for a comparable seal case fabrication in which a hole 31 is punched in a piece of strip stock 32 leaving a slug as waste. More waste 34 is produced when a ring 35 is formed around the hole 31 and separated from the strip stock 32 to form a generally cylindrical case 10 with an internal flange 11.

A comparative study of these two methods of seal case manufacture shows that the preferred method of the present invention depicted in FIG. 3A can utilize 95% of the basic metal stock to produce seal cases while only 5% of the basic stock is wasted. In the prior art method of seal case manufacture depicted in FIG. 3C an average of 70% of the basic stock can be made into seal cases while 30% of the basic stock is wasted. The 25% reduction of waste by the present invention over the prior art means that four seal cases can now be produced from the same strip of metal that produced three seal cases by the prior art. When plain cylindrical cases without flanges can be used, production of waste can be virtually eliminated.

Figure 4:
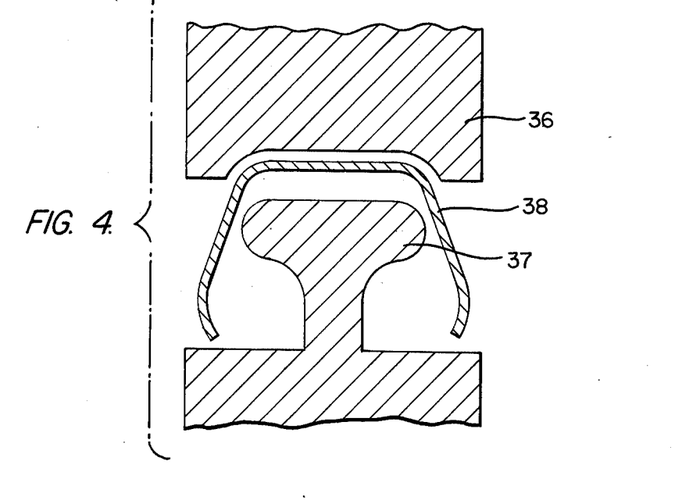
FIG. 4 is an end view of the second or U forming operation.

FIG. 4 is an exploded end view of station 5 of FIG. 3A in which a form die 36 continues the ring forming process by pressing the flat cut sheet metal of station 4 in FIG. 3A over a mandrel 37 to produce a generally U-shaped piece 38. This U-shaped piece 38 is then moved to station 6 of FIG. 3A which is shown as an exploded end view in FIG. 5. At this station an upper forming die 39 and a lower form die 40 close on the U-shaped piece 38 of FIG. 4 to form a ring 41 around a mandrel 42. It is at this final station that the clinch-butt joint is assembled. The mating process between parts 14 and 15 of FIG. 3A is accomplished by coining which is necessary because the parts 14 and 15 are designed with an interference fit. The extreme pressures, however, that are generated when final forming dies 39 and 40 of FIG. 5 close around the mandrel 42 cause the metal 41 to be coined or flow into available spaces to form a semi-permanent joint. In case a more permanent joint is required, the bond at the butt joint could be accomplished by brazing, soldering, welding, or any of several adhesives. The limitation for such a process would be that the cost of the joint must be less than the cost of the scrap being saved. Other less critical applications might be adequately served by a simple ring with no flange and no joint. Such an application could be designed in which no waste would be produced.

Figure 5:
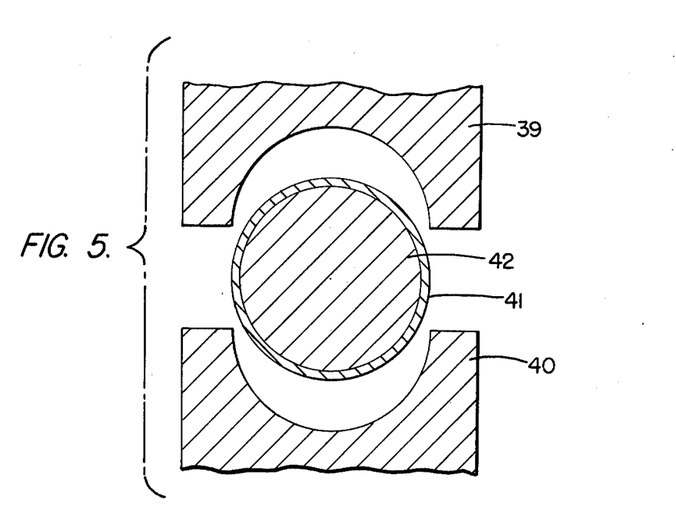
FIG. 5 is an end view of the third or finish ring forming operation.
Figure 6A:
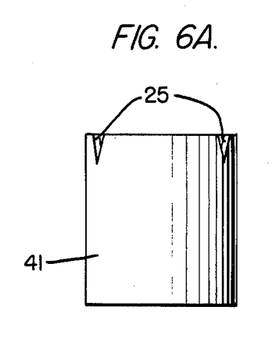
FIG. 6A thru 6E are views in cross-section and isometrics showing the progressive formation of a radial flange on the generally cylindrical case.
Figure 6B:
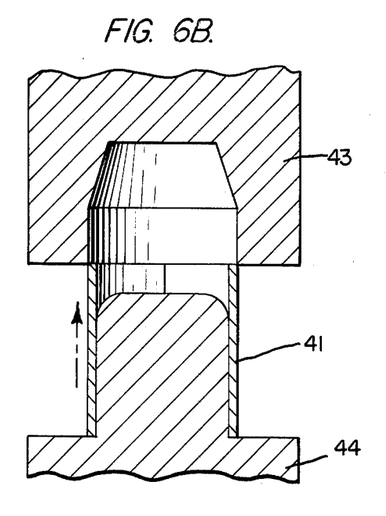
Figure 6C:
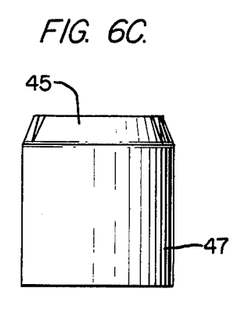
Figure 6D:
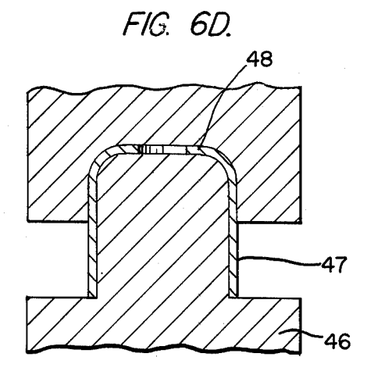
Figure 6E:
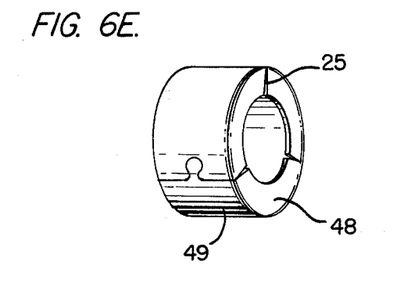

FIGS. 6A thru 6E show the formation of an internal flange on the ring 41 shown in FIG. 5. The first stage of this process shows a cross-section of the first form die 43 partially closed around a ring 41 which has been inserted over a form punch 44. Closing this die completely will upset ring 41 so that the flange area 45 is about half formed as shown on ring 47. The next phase takes ring 47 and places it on the final form punch 46 which is shown in cross-section with the internal flange 48 completely formed and shown in perspective as part of a finished ring 49.

Figure 7:
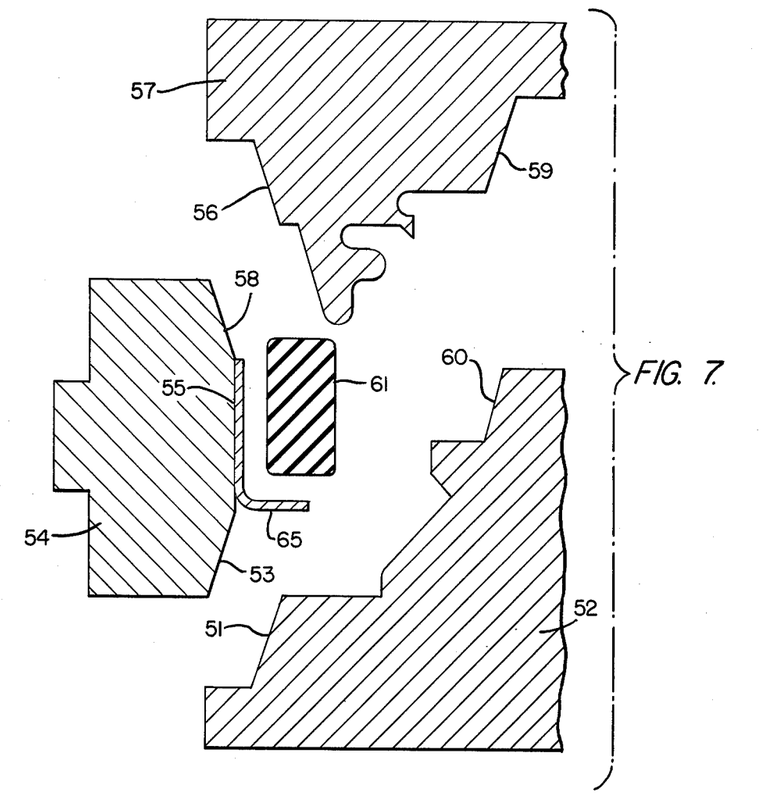
FIG. 7 is an exploded view in cross-section of the finished metal case in relation to the mold in which the elastomer is cured and bonded.
Figure 8:
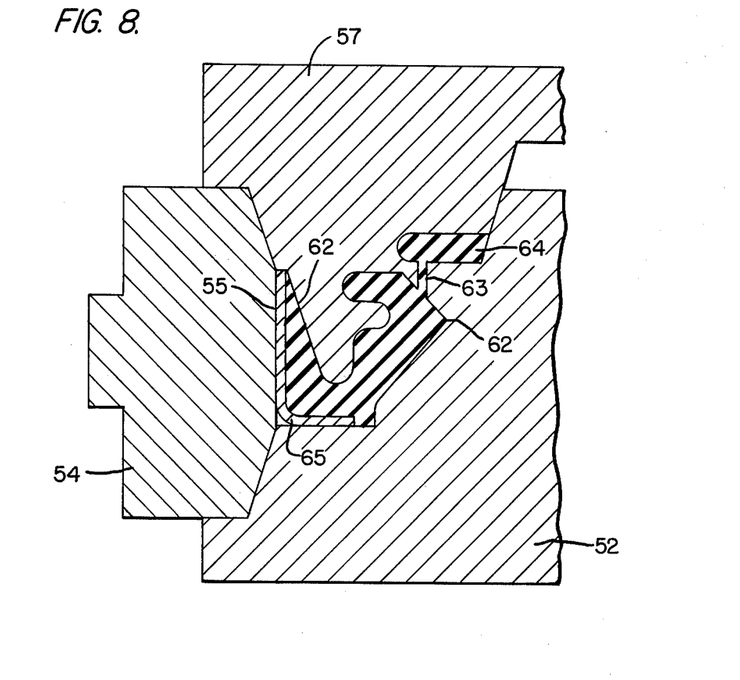
FIG. 8 is a view similar to FIG. 7 in which the mold is closed for cure and bonding of the elastomer to the metal case.

FIG. 7 is an exploded view of a partial cross-section of a typical radial shaft seal moldng operation in which the ring 65 of the present invention is shown in relation to the other molding components. The taper 51 of the lower cavity 52 fits the taper 53 of the center ring 54. The ring 65 of the present invention is a press fit into the center ring 54 at the interface 55. The external taper 56 of the upper cavity 57 fits into the taper 58 of the center ring 54 while the internal taper 59 of the upper cavity fits into the top taper 60 of the lower cavity 52 as the mold is closed as shown in the partial cross-section of FIG. 8. The elastomeric prep 61 of FIG. 7 is a ring of appropriate diameter of uncured stock the volume of which is slightly larger than the volume of the cavity of the mold when it is in the closed position shown in FIG. 8. Closing the mold, therefore, pressurizes the elastomeric prep 61 of FIG. 7 and causes it to flow throughout the cavity 62 of the closed mold FIG. 8. Excess prep flows through a narrow channel 63 into a rind cavity 64 where it remains while the elastomer is being cured by high temperature and high pressure for a prescribed length of time. After cure the mold is opened, the seal is removed and the rind from cavity 64 is easily torn away at the point where the narrow channel 63 leaves a weak area in the cured elastomer.

Figure 9:
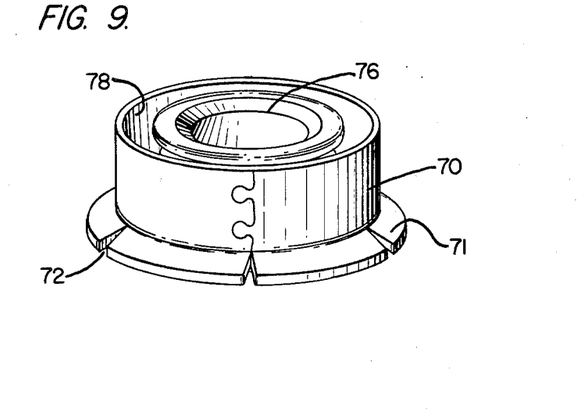
FIG. 9 is an isometric view of a completed seal with an external metal flange.
Figure 10:
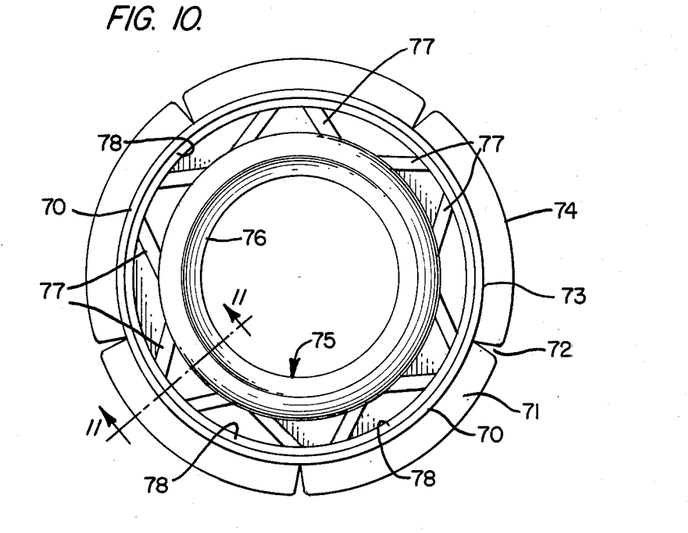
FIG. 10 is an end view of the seal in FIG. 9 showing elastomeric webbing or reinforcing ribs used for axial support of the sealing element.
Figure 11:
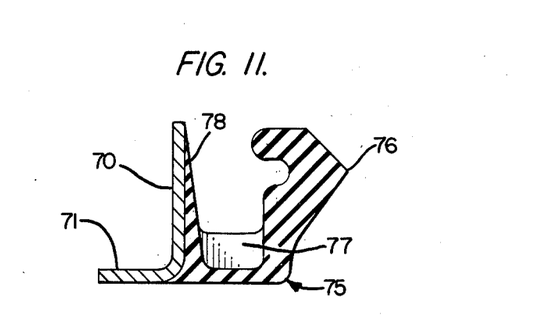
FIG. 11 is a cross-sectional taken at line 11—11 in FIG. 10 showing the external metal flange and internal elastomeric reinforcing ribs.

FIG. 9 is a side view in perspective of a radial lip shaft seal 70 of the present invention with an external flange 71. The end view from the oil or inside of this seal 70 is presented in FIG. 10 with slits 72 opening up in the external flange 71 as the metal is stretched from its initial ring diameter 73 to the increased diameter 74 of the external flange 71. Elastomer 75 is bonded to the inside of the intial ring 73 to form the sealing element 76. The method of making metal case is identical to that shown in FIGS. 3A to 6 with the exception of the stamping (scoring) of slits 72 in lieu of triangular notches 25, and the die for forming flange 71 outwardly of case cylindrical portion 70. It may also be desirable for certain particular seal applications to eliminate the flange entirely and simply bond elastomeric body 75 solely to the radially inner surface 78 of the cylindrical case portion.

Where the radially inward flange 11 of FIG. 1 is eliminated from the case 10 it is deemed desirable for certain applications to make intermediate portion of the elastomeric body 75 greater axially in cross-sectional thickness than otherwise conventional for reinforcement or stability purposes as shown in FIG. 11. It may also be desirable to provide this intermediate portion 75 with a series of reinforcing ribs 77, formed by axially thickening the elastomeric body in selected places as shown in FIGS. 10 and 11. Such design has the advantage of keeping the amount of elastomeric material needed to a minimum and this feature, coupled with the reduction in strip material, produces a very economical seal element.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A radial lip shaft seal including, in combination:
a rigid generally cylindrical reinforcing case having a cylindrical portion with a free end, a flange portion extending radially from said cylindrical portion at an end thereof opposite said free end, said flange portion also having a free end,
said case being formed initially from a flat rigid rectangular strip bent along its major axis to define said cylindrical portion and said flange portion, the ends of said strip defining a continuous parting line extending throughout the axial length of said case including said cylindrical portion and said flange portion, the ends of said strip along the parting line within the area of said cylindrical portion being in abutting engagement with one another, and the ends of said strip along the remainder of said parting line within the flange portion being in spaced relation with one another, elastomeric seal means supported by said case and including a main body portion bonded to said case and a shaft engaging main lip portion integral with and extending radially inwardly from said main body portion, and preventive means for preventing egress of lubricant from said parting line, said preventive means including said main body portion completely covering at least the entire said parting line along said cylindrical portion of the case and completely covering at least one of said free ends of the case, and
said main lip portion including a continuous, inseparable, circumferential lip adapted to engage a cylindrical shaft at an uninterrupted edge defined by the intersection of two radially inwardly mutually converging surfaces of said main lip portion.

2. A radial lip shaft seal of claim 1 in which said ends of said strip along the parting line within the cylindrical portion of said case are held in abutting engagement by means comprising male and female clinch parts located at a respective one of each said ends and interfitted and coined into locked engagement with one another.

3. A radial lip shaft seal of claim 2 in which said main body portion has been thickened axially in selected places to form a series of reinforcing ribs symmetrically spaced about the inner periphery of said cylindrical portion of the case and extending radially to said main lip portion of said elastomeric seal means thereby lending stability to the main body portion of the elastomeric seal means while maintaining the amount of elastomer needed to a minimum.

* * * * *

UNITED STATES PATENT OFFICE
CERTIFICATE OF CORRECTION

Patent No. 4,052,077  Dated October 4, 1977

Inventor(s) Samuel E. MacArthur et al.

It is certified that error appears in the above-identified patent and that said Letters Patent are hereby corrected as shown below:

Sheets 1, 4 and 5 of the drawings should be deleted and substituted with the attached sheets, respectively.

The drawing figure on the cover sheet should be deleted and should appear as per Figure 2 on attached sheet 1.

*Signed and Sealed this*

*Twenty-third* Day of *May 1978*

[SEAL]

Attest:

RUTH C. MASON  
*Attesting Officer*

LUTRELLE F. PARKER  
*Acting Commissioner of Patents and Trademarks*